(12) United States Patent
Hsu (10) Patent No.: US 12,384,480 B2
(45) Date of Patent: Aug. 12, 2025

(54) ADJUSTABLE PNEUMATIC-HYDRAULIC PRESSURE UNIT FOR STROKE CONTROL

(71) Applicant: KIND SHOCK HI-TECH CO., LTD., Tainan (TW)

(72) Inventor: Jung-Yu Hsu, Tainan (TW)

(73) Assignee: KIND SHOCK HI-TECH CO., LTD., Tainan (TW)

( * ) Notice: Subject to any disclaimer, the term of this patent is extended or adjusted under 35 U.S.C. 154(b) by 192 days.

(21) Appl. No.: 18/453,752

(22) Filed: Aug. 22, 2023

(65) Prior Publication Data

US 2025/0002101 A1 Jan. 2, 2025

(30) Foreign Application Priority Data

Jun. 30, 2023 (TW) ................................. 112124641

(51) Int. Cl.
*B62J 1/08* (2006.01)

(52) U.S. Cl.
CPC ............ B62J 1/08 (2013.01); *B62J 2001/085* (2013.01)

(58) Field of Classification Search
CPC .............................. B62J 1/08; B62J 2001/085
USPC ....................... 297/215.14; 280/287; 248/599
See application file for complete search history.

(56) References Cited

U.S. PATENT DOCUMENTS

| | | | | |
|---|---|---|---|---|
| 2013/0093231 A1* | 4/2013 | Hsu | ........................... | A47C 3/40 |
| | | | | 297/344.19 |
| 2013/0119634 A1* | 5/2013 | Camp | ........................ | B62J 1/08 |
| | | | | 280/287 |
| 2013/0221713 A1* | 8/2013 | Pelot | ....................... | G05B 15/02 |
| | | | | 297/215.13 |
| 2017/0197680 A1* | 7/2017 | Feng | ........................... | B62J 1/08 |
| 2017/0227082 A1* | 8/2017 | Hsu | ............................ | F16F 9/44 |
| 2017/0240234 A1* | 8/2017 | Tsai | ............................ | B62J 1/08 |
| 2019/0002051 A1* | 1/2019 | Shipman | .................... | B62J 1/06 |
| 2020/0023918 A1* | 1/2020 | Shirai | ........................ | B62J 1/08 |
| 2021/0206443 A1* | 7/2021 | Sakagawa | .............. | B62K 23/02 |
| 2021/0403111 A1* | 12/2021 | Chambers | .................. | B62J 1/08 |
| 2022/0041234 A1* | 2/2022 | Sakagawa | .............. | G01D 5/142 |
| 2022/0126938 A1* | 4/2022 | Sakagawa | .............. | B62K 25/08 |
| 2022/0153371 A1* | 5/2022 | Tung | ....................... | B62K 19/36 |
| 2022/0185418 A1* | 6/2022 | Christ | ........................ | B62J 1/08 |
| 2022/0210650 A1* | 6/2022 | Ericksen | ................ | H04W 4/80 |
| 2022/0235878 A1* | 7/2022 | Lin | ........................ | F16K 39/022 |
| 2023/0023599 A1* | 1/2023 | Coaplen | ..................... | B62J 1/08 |
| 2023/0192208 A1* | 6/2023 | Watson | .................... | B62J 45/41 |
| | | | | 701/49 |
| 2023/0264771 A1* | 8/2023 | Dunlap | ...................... | B62J 1/08 |
| | | | | 297/215.13 |
| 2023/0348003 A1* | 11/2023 | Hsu | ............................ | B62J 1/08 |

* cited by examiner

*Primary Examiner* — Jose V Chen
(74) *Attorney, Agent, or Firm* — Best & Flanagan LLP (57) ABSTRACT

An adjustable pneumatic-hydraulic pressure unit for stroke control including a cylinder and an actuating tube, an oil seal valve seat, a piston valve seat, and a plurality of pistons to form a plurality of oil chambers and a plurality of oil passages; whereby a piston is used to close to block or to open to conduct the oil passages, causing the oil-gas filled passages to form an internal pressure, which controls the actuating tube to be contracted downward or restored upward relative to the cylinder, so that the total exposed stroke of the actuating tube can be adjusted, and forms the pneumatic-hydraulic pressure unit with the function of stroke memory to cater the needs for riding and storing bicycles.

14 Claims, 7 Drawing Sheets

ADJUSTABLE PNEUMATIC-HYDRAULIC PRESSURE UNIT FOR STROKE CONTROL

FIELD OF INVENTION

The present invention relates to a pneumatic-hydraulic pressure unit, and more particularly to a pneumatic-hydraulic pressure unit having a total stroke adjustment function.

BACKGROUND OF THE INVENTION

The height of a conventional bicycle saddle can be adjusted to meet the demands of different heights of riders. The lifting device of the saddle of the conventional bicycle is mainly divided into mechanical, pneumatic-hydraulic, and hybrid, by installing the lifting device between the seat tube and the saddle support tube of the bicycle, the relative linear displacement between the sleeves makes the relative position of the seat tube and the saddle support tube change and then adjust the height of the saddle to meet the demand of users with different heights or the adjustment of the height of the seat tube in different terrain for cycling.

However, the pneumatic-hydraulic saddle lifting device of the conventional bicycle does not have a memory function, and it cannot be retracted and restored to the previously adjusted height but must be readjusted each time it is retracted, which results in an unsatisfactory user experience and needs further improvement.

SUMMARY OF THE INVENTION

To solve the problem that the above-mentioned bicycle pneumatic-hydraulic pressure unit does not have a lift memory function, the present invention provides an adjustable pneumatic-hydraulic pressure unit for stroke control mainly by balancing the pneumatic-hydraulic pressure within the unit together with the control of oil passage conduction or blockage, so that the total exposed stroke of the actuating tube connected to the saddle can be adjusted to form the pneumatic-hydraulic pressure unit with the function of stroke memory, thereby improving the use experience of the saddle and satisfying the needs of the bicycle for riding and storage at the same time.

Based on the above purposes, the present invention is to provide an adjustable pneumatic-hydraulic pressure unit for stroke control, comprising: a cylinder containing an outer tube, an inner tube, and an oil seal; the oil seal being sealed and fixed to the top of the outer tube and the inner tube, with an axial hole threading through the center of the oil seal; an actuating tube sealed and combined with the oil seal and movably threaded through the axial hole for axial movement relative to the inner tube; a first valve group sealed and fixed to the bottom of the outer tube and the inner tube; the inner surface of the outer tube, the outer surface of the inner tube, the oil seal, and the first valve group together forming an oil-gas mixing chamber; the first valve group being provided with a first oil passage internally communicating the oil-gas mixing chamber to the inner chamber of the inner tube; and a second valve group fixedly attached to the bottom of the actuating tube and sealed and fixed to the inner surface of the inner tube; the inner surface of the inner tube, the outer surface of the actuating tube, the oil seal, and the top of the second valve group together forming an upper oil chamber, and the inner surface of the inner tube, the bottom of the second valve group, and the first valve group together forming a lower oil chamber; and the second valve group is internally provided with a second oil passage communicating the upper oil chamber and the lower oil chamber; whereby, the first valve group blocks or conducts the oil-gas mixing chamber and the lower oil chamber by closing or opening the first oil passage, and the second valve group blocks or conducts the upper oil chamber and the lower oil chamber by closing or opening the second oil passage.

Further, the adjustable pneumatic-hydraulic pressure unit for stroke control as described above, wherein the bottom of the oil seal is covered on the top of the inner tube, and the top edge of the inner tube is sealed against the circumferential plane of the axial hole; the first valve group comprising an oil seal valve seat and a first piston rod, wherein the oil seal valve seat is sealed and fixed to the bottom of the outer and inner tubes, and the inner surface of the outer tube, the outer surface of the inner tube, the oil seal, and the oil seal valve seat together form the oil-gas mixing chamber; at the axis of the oil seal valve seat is formed into a shaft tube, and a first valve opening is formed at the joint of the shaft tube and the inner tube, and a plurality of orifices are provided on peripheral wall of the shaft tube communicating with the oil-gas mixing chamber; the first piston rod is movably threaded into the shaft tube of the oil seal valve seat to close or open the first valve opening to block or conduct the first oil passage; the second valve group comprising a piston valve seat and a first piston rod, wherein the piston valve seat is fixed to the bottom of the actuating tube and sealingly combined with the inner surface of the inner tube, wherein the inner surface of the inner tube, the outer surface of the actuating tube, the oil seal, and the top of the piston valve seat together form the upper oil chamber, and the inner surface of the inner tube, the bottom of the piston valve seat, and the oil seal valve seat together form the lower oil chamber; at the axis of the piston valve seat is formed into a shaft tube, a second valve opening is formed at the joint of the shaft tube and the inner tube, and a plurality of orifices are provided on the peripheral wall of the shaft tube communicating with the upper oil chamber; the second piston rod is movably threaded through the shaft tube of the piston valve seat to close or open the second valve opening to block or conduct the second oil passage.

Further, the adjustable pneumatic-hydraulic pressure unit for stroke control as described above, wherein the bottom of the oil seal of the cylinder is covered on the top of the inner tube, and the top edge of the inner tube is sealed against the circumferential plane of the axial hole; the first valve group comprising an oil seal valve seat and a first piston rod, wherein the oil seal valve seat is sealed and fixed to the bottom of the outer and inner tubes, and the inner surface of the outer tube, the outer surface of the inner tube, the oil seal, and the oil seal valve seat together form the oil-gas mixing chamber; at the axis of the oil seal valve seat is formed into a shaft tube, and a first valve opening is formed at the joint of the shaft tube and the inner tube, and a plurality of orifices are provided on peripheral wall of the shaft tube communicating with the oil-gas mixing chamber; the first piston rod is movably threaded through the shaft tube of the oil seal valve seat to close or open the first valve opening to block or conduct the first oil passage; the second valve group comprising a piston valve seat and a second piston rod, wherein the piston valve seat is formed into a piston portion in the middle section, and the top and bottom of the piston valve seat are respectively contracted to form a connecting shaft portion and a valve seat; the outer surface of the piston portion is sealingly combined with the inner surface of the inner tube, the inner surface of the inner tube, the outer surface of the actuating tube, the oil seal, and the piston valve seat together form the upper oil chamber, and the inner surface of the inner tube, the piston valve seat, and the oil seal valve seat together form the lower oil chamber; the piston portion and the connecting shaft portion have an axial passage running through their inner portions, the connecting shaft portion is fixed to the bottom of the actuating tube, the axial passage runs through the top of the piston valve seat and communicates with the inner side of the actuating tube, and a plurality of passages are provided in the peripheral wall of the axial passage of the piston valve seat to communicate with the upper chamber; the inner side of the seat portion has a groove formed by expanding out from the axial passage, and a plurality of second valve openings are provided in the peripheral wall of the groove of the valve seat to communicate with the lower oil chamber; a spring is fixed to the end of the valve seat; the second piston rod is movably threaded through the axial passage and the groove of the piston valve seat to close or open the second valve opening to block or conduct the second oil passage.

Further, the adjustable pneumatic-hydraulic pressure unit for stroke control as described above, wherein the bottom periphery of the oil seal is protruded along the axial direction to form a ring-concave wall, and a washer is concavely embedded in the inner surface of the ring-concave wall; so that the top of the inner tube is inserted in a slot defined by the ring-concave wall, and the top edge of the inner tube is pressed against the circumferential plane of the axial hole, and the inner surface of the ring-concave wall is sealingly combined with the outer surface of the inner tube through a washer, thereby enabling the inner chamber and the outer surface of the inner tube to be sealingly isolated from each other and not communicated at the top.

Further, the adjustable pneumatic-hydraulic pressure unit for stroke control as described above, wherein the middle section of the first piston rod is constricted to form a contraction portion; the inner surface of the shaft tube of the oil seal valve seat and the contraction portion of the first piston rod together form a lower oil recess; and the first valve opening, the lower oil recess, and the orifice of the oil seal valve seat together form a first oil passage.

Further, the adjustable pneumatic-hydraulic pressure unit for stroke control as described above, wherein the middle section of the second piston rod is constricted to form a contraction portion; the inner surface of the shaft tube of the piston valve seat and the contraction portion of the second piston rod together form an upper oil recess; and the second valve opening of the piston valve seat, the upper oil recess, and the orifice together form the second oil passage.

Further, the adjustable pneumatic-hydraulic pressure unit for stroke control as described above, wherein the middle section of the second piston rod is constricted to form a rod body; the rod body of the second piston rod and the inner surface of the axial passage, and the groove of the piston valve seat together form an upper oil recess; and the second valve opening of the piston valve seat, the upper oil recess, and the passage together form the second oil passage.

Further, the adjustable pneumatic-hydraulic pressure unit for stroke control as described above, wherein the bottom of the second piston rod is shaped as a piston head; the piston valve seat further comprises an outer sleeve snap-fitted to the outside of the valve seat, wherein the outer sleeve has opposing closed and open ends, wherein the inner portion of the outer sleeve is formed into a groove at the closed end, and the spring is mounted between the groove and the piston head of the second piston rod; the piston head of the second piston rod is axially provided with an oil passage from its bottom surface, the bottom of the oil passage is communicated with the groove of the outer sleeve, and the top of the oil passage is provided with a plurality of oil orifices along the radial direction to be communicated with the upper oil recess; the groove, the oil passage, and the oil orifices together form a balanced oil passage.

Further, the adjustable pneumatic-hydraulic pressure unit for stroke control as described above, wherein the actuating tube is steplessly adjusted for lifting and lowering by axial displacement relative to the cylinder in a state in which the second piston rod closes the second valve opening and the first piston rod opens the first valve opening; and the actuating tube is positioned relative to the cylinder in a state in which the second piston rod closes the second valve opening and the first piston rod closes the first valve opening.

Further, the adjustable pneumatic-hydraulic pressure unit for stroke control as described above, wherein the actuating tube is adjusted its total exposed stroke by axial displacement relative to the cylinder in a state in which the first piston rod opens the first valve opening and the second piston rod opens the second valve opening, and the second piston rod closes the second valve opening after adjusting the total exposed stroke of the cylinder so that the actuating tube is positioned relative to the cylinder in the state in which no external force is applied.

Other objects, advantages, and features of the present invention will be appreciated by the detailed description of the following preferred embodiments with reference to the accompanying drawings.

DETAILED DESCRIPTION OF THE PREFERRED EMBODIMENTS

Figure 9:
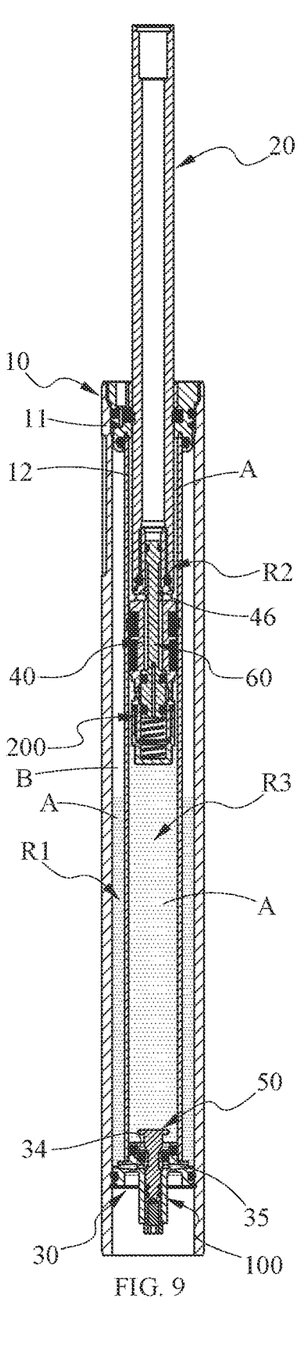
Figure 10:
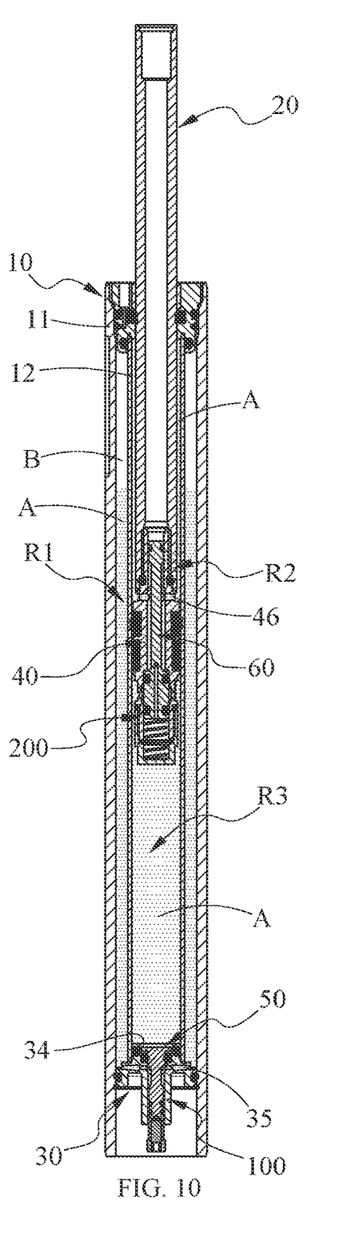
Figure 11:
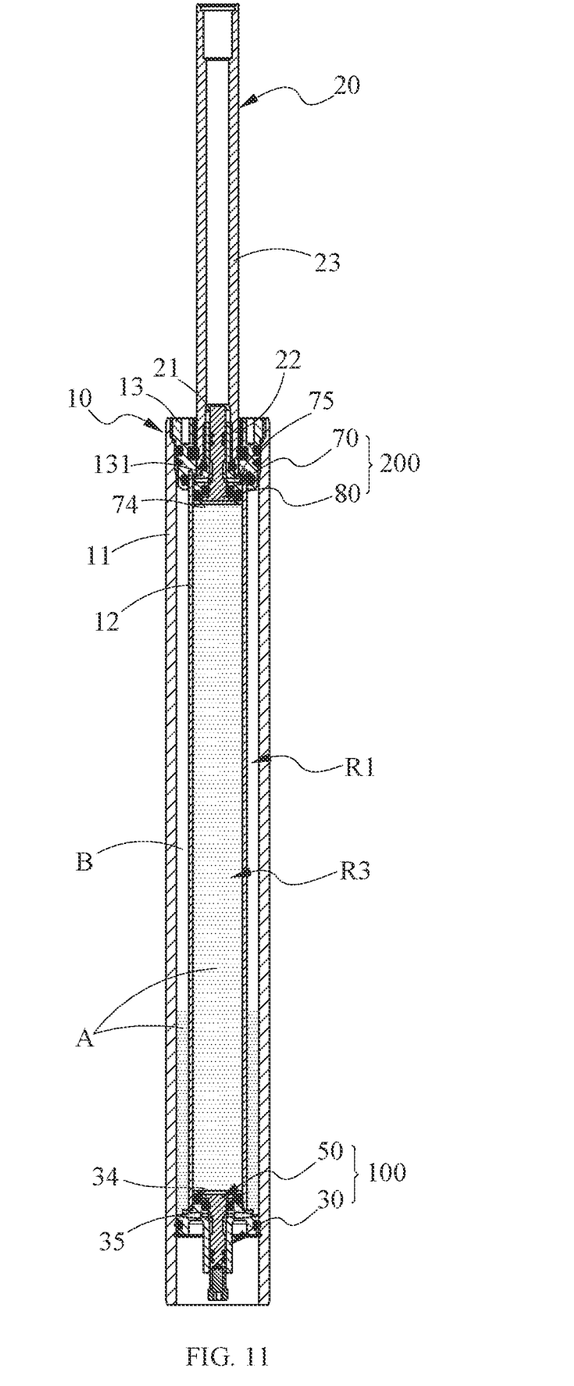
FIG. 11 is a cross-sectional schematic diagram of the overall structure of the second embodiment of the present invention.
Figure 12:
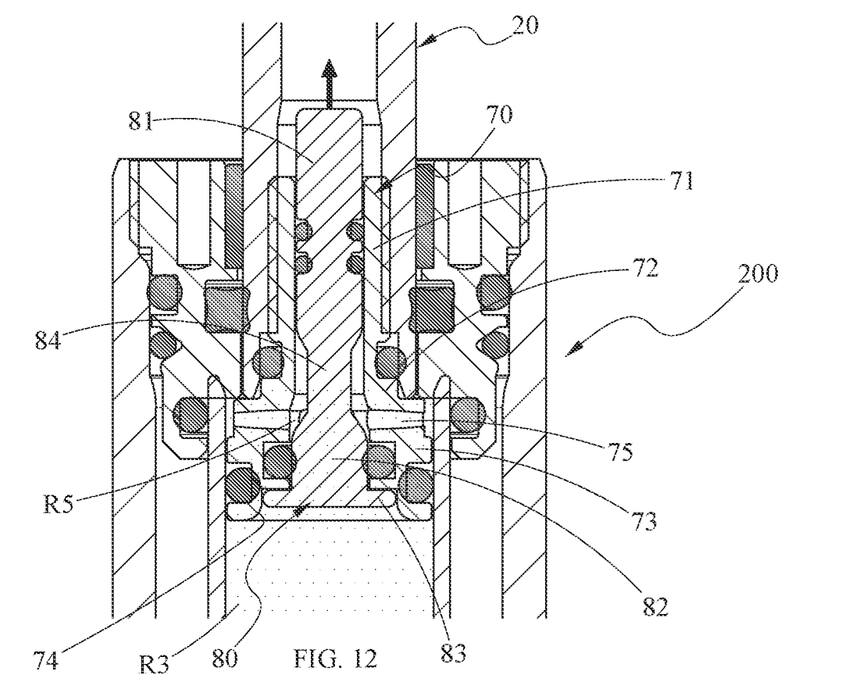
FIG. 12 is a cross-sectional schematic diagram of the second valve group of the second embodiment of the present invention in an open state.
Figure 13:
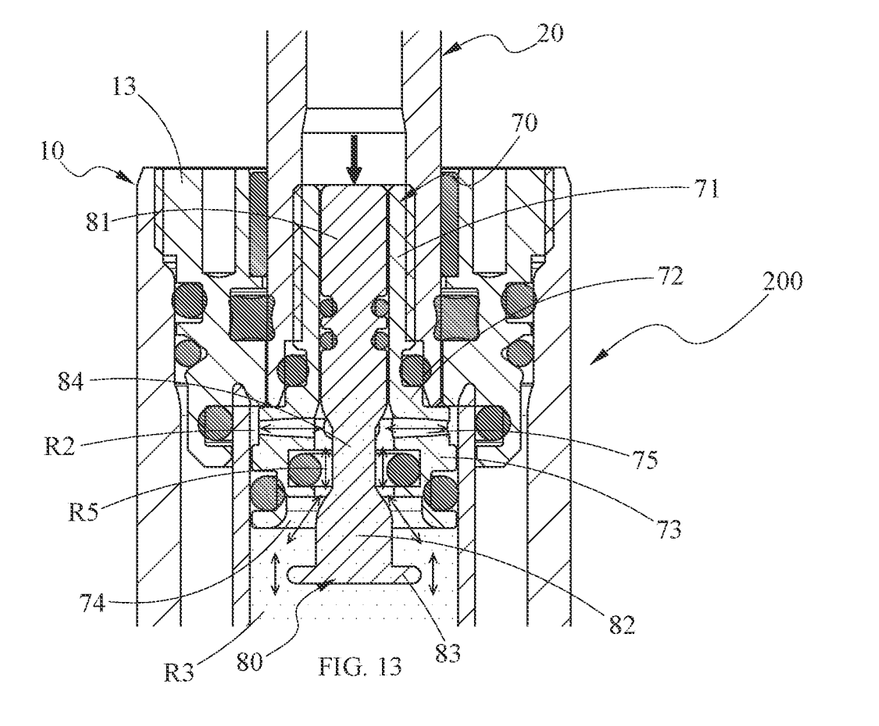
FIG. 13 is a cross-sectional schematic diagram of the second valve group of the second embodiment of the present invention in a closed state.

In order to better understand the technical features and practical effectiveness of the present invention in detail and to be able to realize it by the contents of the specification, it is hereby further described in detail by the first embodiment shown in FIGS. 1 to 10 and the second embodiment shown in FIGS. 11 to 13.

In the embodiments of the present invention, directional terms such as "top" and "top end" refer to the upper or top side of the device of the present invention in the drawing, and "bottom" and "bottom end" refer to the lower or bottom side of the device of the present invention in the drawing, and the aforesaid directional terms do not need to be used to restrict the direction of the device of the present invention in actual use.

In the embodiment of the present invention, "axial direction" refers to the direction of extension and contraction along the stroke adjustable pneumatic-hydraulic pressure unit, and "radial direction" refers to the direction radiating from the center of the axial direction.

As shown in FIGS. 1 to 5, the first embodiment of an adjustable pneumatic-hydraulic pressure unit for stroke control of the present invention mainly comprises a cylinder 10 and an actuator tube 20 therein, a first valve group 100, and a second valve group 200; wherein the first valve group 100 comprises an oil seal valve seat 30 and a first piston rod 50 and is disposed at a bottom of the cylinder 10, and the second valve group 200 comprises a piston valve seat 40 and a second piston rod 60 and is disposed at a top of the cylinder 10.

Figure 1:
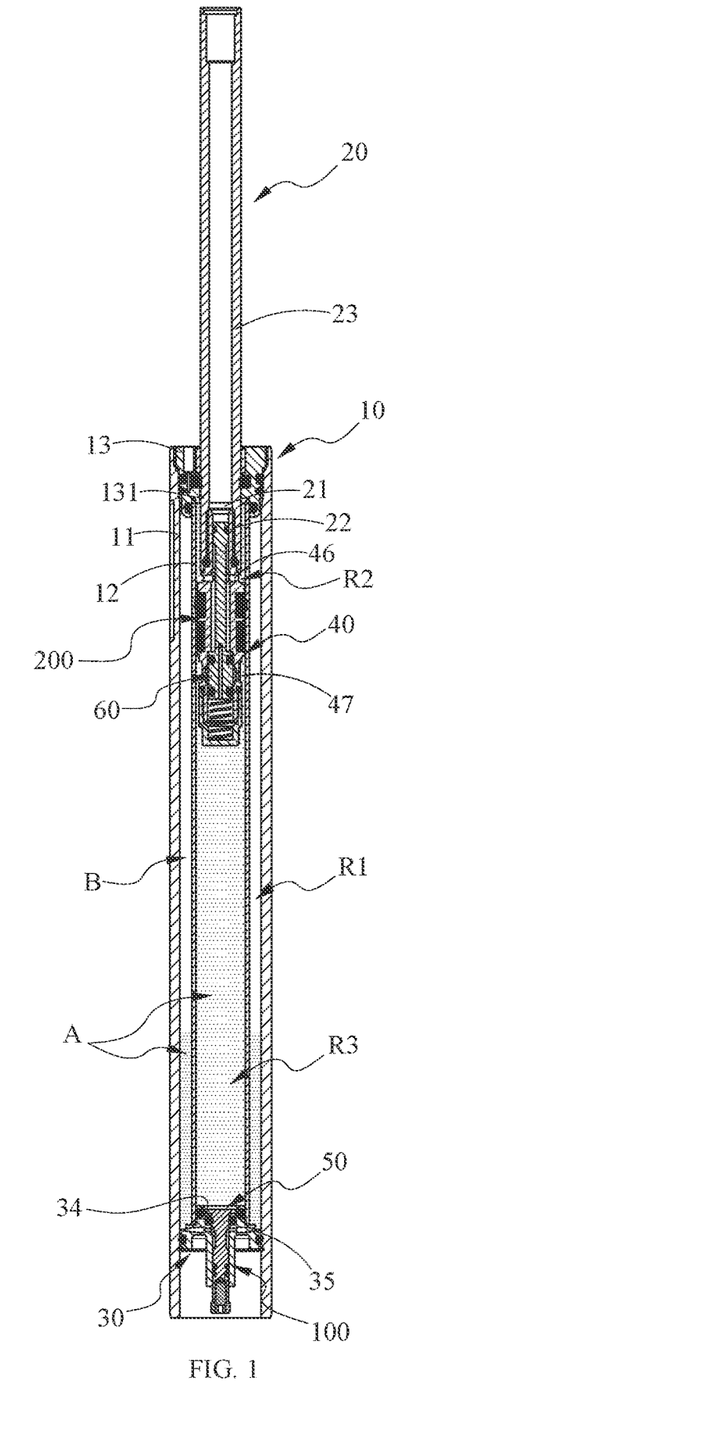
FIG. 1 is a schematic diagram of the overall structure of the first embodiment of the present invention.

Wherein, as shown in FIG. 1, the cylinder 10 comprises an outer tube 11, an inner tube 12, and an oil seal 13; the oil seal 13 is sealingly fixed to the top of the outer tube 11 and the inner tube 12, the axis of the oil seal 13 is threaded with an axial hole 131, and the bottom of the oil seal 13 is covered on the top of the inner tube 12, and the top edge of the inner tube 12 is sealingly fixed to the circumferential plane of the axial hole 131.

Figure 4:
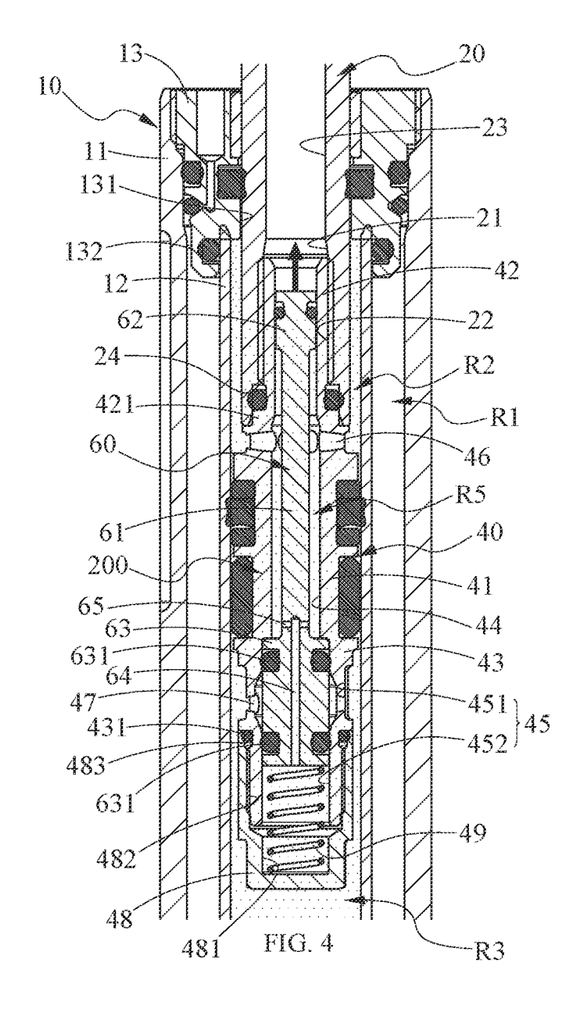
FIG. 4 is a cross-sectional schematic diagram of the second valve group of the first embodiment of the present invention in a closed state.
Figure 5:
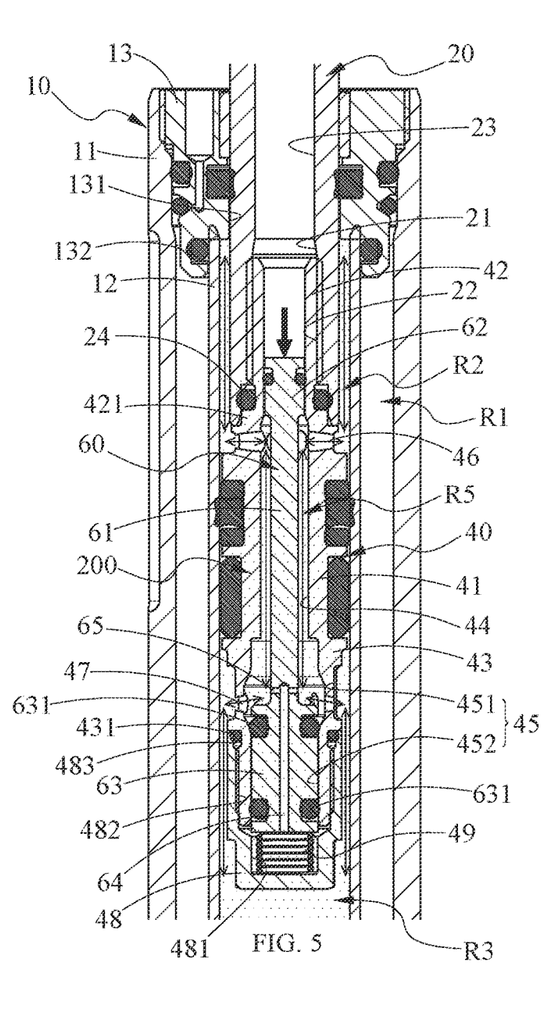
FIG. 5 is a cross-sectional schematic diagram of the second valve group of the first embodiment of the present invention in an open state.

In the first embodiment of the present invention, as shown in FIGS. 4 and 5, the oil seal 13 is shaped as a multi-stage cylinder, the top portion of the oil seal 13 is formed as a round shape and embedded with the top opening of the outer tube 11, the middle section of the oil seal 13 is formed as a contraction from the top and embedded with two washers on the periphery to be sealed with the inner surface of the outer tube 11, and the bottom periphery of the oil seal 13 is protruded along the axial direction to form a ring-concave wall 132 with a washer embedded in the inner surface; and the top edge of the inner tube 12 is inserted into a slot defined in the ring-concave wall 132, and the top edge of the inner tube 12 is positioned against the circumferential plane of the axial hole 131, and the inner surface of the ring-concave wall 132 is sealingly combined with the outer surface of the inner tube 12 by means of the washer; so that the inner chamber and the top of the inner tube 12 are sealingly isolated from each other at the top.

In the first embodiment of the present invention, as shown in FIGS. 4 and 5, the two washers located at the periphery of the middle section of the oil seal 13 are circular profile washers; and the washers located at the inner recess of the ring-concave wall 132 are circular profile washers.

In the first embodiment of the present invention, "sealingly combination" refers to the provision of sealing washers to close the gap between the surfaces of the components and make the two components tightly combined, and when the external force applied to one of the components is greater than the frictional force of the tightly combined components, the component to which the external force is applied can be movably displaced relative to the other component. For example, as shown in FIGS. 4 and 5, two washers are provided between the outer surface of the actuating tube 20 and the hole wall of the axial hole 131 of the oil seal 13; when the actuating tube 20 is not subjected to an external force, the actuating tube 20 is positioned by the friction between the outer surface of the actuating tube 20 and the two washers; and when the actuating tube 20 is subjected to an external axial force greater than the friction between the surface of the actuating tube 20 and the washer, the actuating tube 20 is braked by the external axial force and displaced downwardly and retracted into the cylinder 10, or upwardly and extended out of the cylinder 10.

Wherein, as shown in FIGS. 1, 4, and 5, the inner portion of the actuating tube 20 is provided with an axial hole through both ends, and a contracted hole section 21 is provided in the axial hole with a contracted hole from the bottom to the top, and a socket section 22 is formed below the contracted hole section in the axial hole of the actuating tube 20 for sealingly and integrally fitting on the outside of a connecting shaft portion 42 of the piston valve seat 40, and a coupled hole section 23 is formed above the contracted hole section in the axial hole of the actuating tube 20 for providing a brake switch (not shown) for pulling the second piston rod 60 downward to open or reset to close a second valve opening 47 of the piston valve seat 40.

Figure 2:
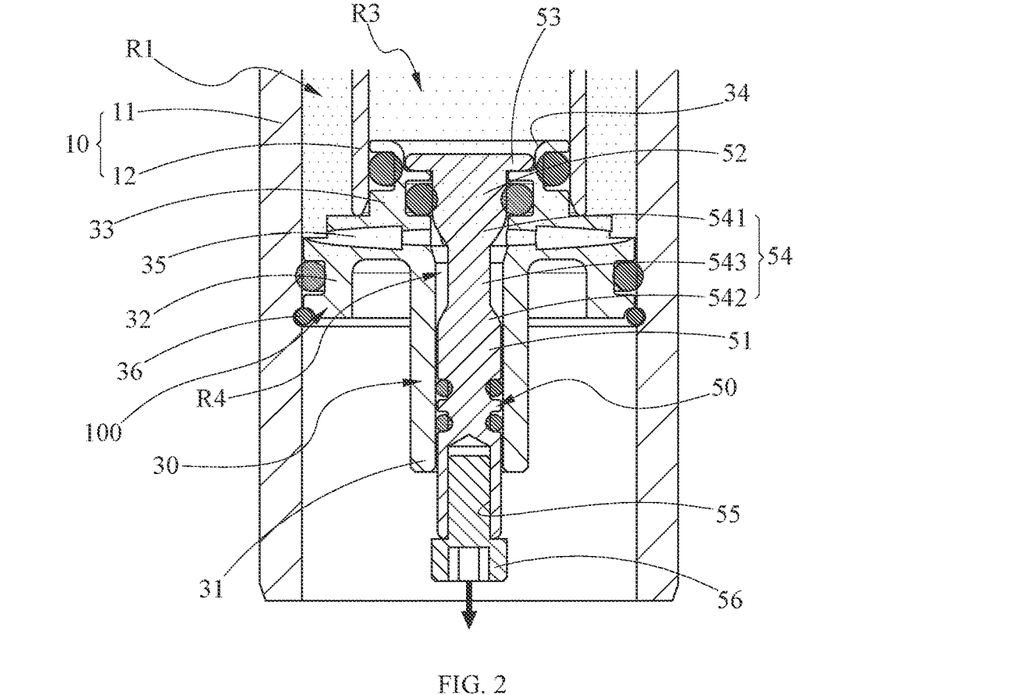
FIG. 2 is a cross-sectional schematic diagram of the first valve group of the first embodiment of the present invention in a closed state.
Figure 3:
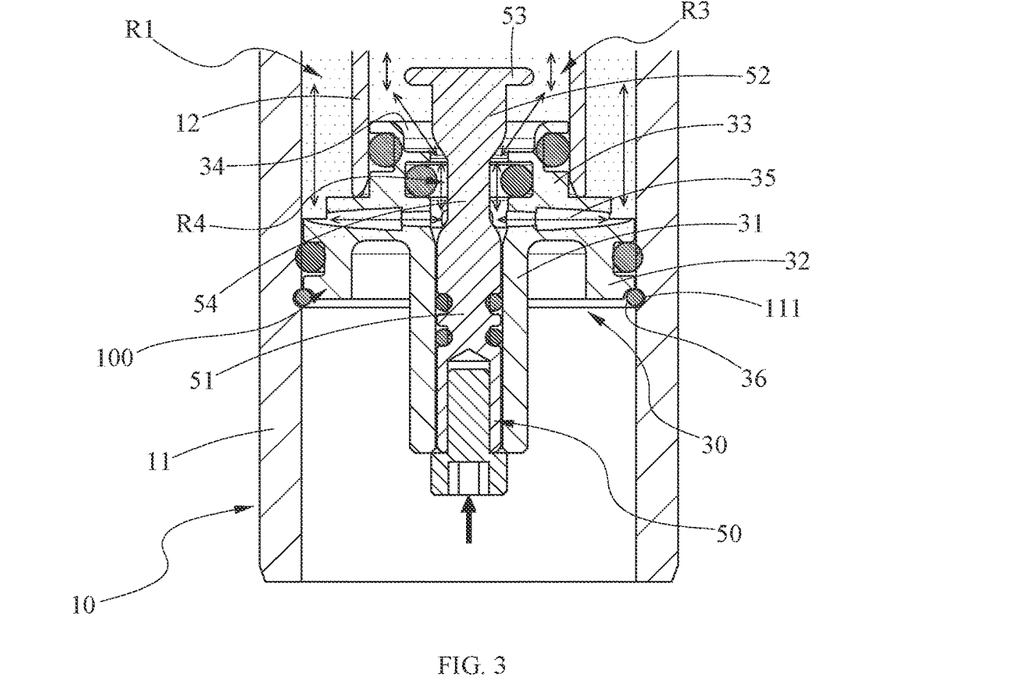
FIG. 3 is a cross-sectional schematic diagram of the first valve group of the first embodiment of the present invention in an open state.

Wherein, as shown in FIGS. 2 and 3, the oil seal valve seat 30 is shaped as a multi-stage cylinder, with a shaft tube 31 formed on the axis thereof, a large diameter portion 32 and a small diameter portion 33 are formed at the top of the shaft tube 31 by expanding the outer part of the shaft tube 31, a peripheral surface of the large diameter portion 32 is sealed to the inner surface of the outer tube 11 by means of a washer, and the small diameter portion 33 is located at the end of the shaft tube 31, a peripheral surface of the small diameter portion 33 is sealed to the inner surface of the inner tube 12 by means of a washer; and wherein a first valve opening 34 is formed at the joint between the shaft tube 31 and the inner tube 12; whereby, the inner surface of the outer tube 11, the outer surface of the inner tube 12, the oil seal 13, and the oil seal valve seat 30 together form an oil-gas mixing chamber R1, and the peripheral wall of the shaft tube 31 is provided with a plurality of orifices communicating with the oil-gas mixing chamber R1.

In the first embodiment of the present invention, as shown in FIGS. 2 and 3, a ring-concave groove 111 is provided on the inner surface of the bottom of the outer tube 11, and a C-shaped buckle 36 is embedded in the ring-concave groove 111, and the oil seal valve seat 30 is sealed at the bottom of the outer tube 11 and the inner tube 12 through the restriction of the C-shaped buckle 36.

In the first embodiment of the present invention, as shown in FIGS. 2 and 3, the orifices 35 of the oil seal valve seat 30 are formed between the large diameter portion 32 and the small diameter portion 33 by opening radially from the shaft tube 31. According to an embodiment of the present invention, the number of orifices 35 of the oil seal valve seat 30 may be more than two, preferably an even number, preferably six, but not limited thereto.

As shown in FIGS. 4 and 5, wherein the piston valve seat 40 is shaped as a hollow shaft, with its middle section formed as a piston portion 41, the top and bottom of the piston valve seat 40 are respectively contracted to form a connecting shaft portion 42 and a valve seat 43; the connecting shaft portion 42 is fixedly connected to the bottom of the actuating tube 20; the outer surface of the piston portion 41 is sealingly combined with the inner surface of the inner tube 12 by embedding a number of washers, the inner surface of the inner tube 12, the outer surface of the actuating tube 20, the oil seal 13, and the piston portion 41 of the piston valve seat 40 together form an upper oil chamber R2, the inner surface of the inner tube 12, the piston portion 41 of the piston valve seat 40, and the oil seal valve seat 30 together form a lower oil chamber R3.

The piston valve seat 40 has an axial passage 44 running through the piston portion 41 and the connecting shaft portion 42 to communicate with the inner portion of the actuating tube 20, and a plurality of passages 46 are provided in the peripheral wall of the piston valve seat 40 in the axial passage 44 to communicate with the upper oil chamber R2; the inner portion of the valve seat 43 forms a groove 45 expanding from the axial passage 44, and the groove 45 extends and forms an outreach section 451 and an assembly section 452 from the axial passage 44, and a plurality of second valve openings 47 are provided in the valve seat 43 in the outreach section 451 to communicate with the lower oil chamber R3.

In the first embodiment of the present invention, as shown in FIGS. 4 and 5, the valve seat 43 is provided with an outer sleeve 48 on the outer portion of the valve seat 43 to close the opening of the groove 45. The outer sleeve 48 is shaped as a hollow cylindrical sleeve having opposite closed and open ends, a groove 481 is formed in the inner part of the outer sleeve 48 at the closed end, a sleeve portion 482 is formed by expanding the outer sleeve 48 from the groove 481 toward the open end, a ring rib 483 is provided on the inner surface of the end of the sleeve portion 482, and an annular groove 431 is provided on the outer surface of the seat portion 43 of the piston valve seat 40 and embedded with a washer.

In the first embodiment of the present invention, as shown in FIGS. 4 and 5, the passages 46 of the piston valve seat 40 are formed between the piston portion 41 and the connecting shaft portion 42 by opening radially from the axial passage 44. According to the embodiment of the present invention, the number of passages 46 of the piston valve seat 40 may be more than two, preferably an even number, preferably six, but not limited thereto.

In the first embodiment of the present invention, as shown in FIGS. 4 and 5, the second valve opening 47 of the piston valve seat 40 is radially open from the groove 45 to form an outreach section 451 of the groove 45. According to the embodiment of the present invention, the number of the second valve openings 47 of the piston valve seat 40 may be more than two, preferably an even number, preferably six, but not limited thereto.

In the first embodiment of the present invention, as shown in FIGS. 4 and 5, the axial hole of the actuating tube 20 is expanded from the bottom of the socket section 22 to form an expansion groove 24; a ring shoulder 421 is formed where the connecting shaft portion 42 of the piston valve seat 40 is adjacent to the piston portion 41; so that the connecting shaft portion 42 of the piston valve seat 40 is inserted into the socket section 22 of the actuating tube 20, and the end of the connecting shaft portion 42 presses against and limits on the lower end of the contracted hole section 21 of the actuating tube 20, and a washer is provided for sealing and combining between the ring shoulder 421 and the expansion groove 24.

In the first embodiment of the present invention, as shown in FIGS. 4 and 5, the outer ring of the piston portion 41 of the piston valve seat 40 is provided with an upper groove and a lower groove, wherein three washers having a square profile are provided in the upper groove and a cylindrical washer having a capsule shape in profile is provided in the lower groove. The piston portion 41 is sealingly combined with the inner surface of the inner tube 12 by these four washers.

Wherein, as shown in FIGS. 2 and 3, the two ends of the first piston rod 50 are formed into a shaft 51 and a piston head 52, respectively, the shaft 51 and the piston head 52 are constricted to form a contraction portion 54, the contraction portion 54 has a lower transition section 542 and an upper transition section 541 which are integrally connected to the shaft 51 and the piston head 52, respectively, by a change in diameter, and a neck section 543 of fixed diameter is formed between the upper transition section 541 and the lower transition section 542. The first piston rod 50 is movably threaded through the shaft tube 31 of the oil seal valve seat 30, and the inner surface of the shaft tube 31 and the contraction portion 54 of the first piston rod 50 together form a lower oil recess R4, and the first valve opening 34, the lower oil recess R4, and the orifice 35 of the oil seal valve seat 30 together form a first oil passage. Thereby, the end opening of the shaft tube 31 of the oil seal valve seat 30 is expanded to form the first valve opening 34, and the end of the piston head 52 of the first piston rod 50 is expanded to form a round-shaped stop portion 53; the first oil passage is closed or opened by the movable embedding or retreating of the piston head 52 and the stop portion 53 from the end opening of the shaft tube 31 of the oil seal valve seat 30 and the first valve opening 34.

In the first embodiment of the present invention, the shaft tube 31 of the oil seal valve seat 30 is embedded with a washer on the inner surface from the first valve opening 34 to the orifice 35. As shown in FIG. 2, when the first piston rod 50 is embedded to seal the first oil passage, the stop portion 53 is embedded on the first valve opening 34, and the piston head 52 is embedded in the shaft tube 31 of the oil seal valve seat 30, and the first oil passage is blocked by the washer to sealingly combine between the outer surface of the piston head 52 and the inner surface of the shaft tube 31. As shown in FIG. 3, when the first piston rod 50 retreats to open the first oil passage, the stop portion 53 and a part of the piston head 52 extend into the lower oil chamber R3, and the outer surface of the piston head 52 completely retreats from the washer on the inner surface of the shaft tube 31, so that the lower oil recess R4 between the contraction portion 54 and the shaft tube 31 conducts upward and downward to make the first oil passage communicate with the oil-gas mixing chamber R1 and the lower oil chamber R3.

Specifically, as shown in FIG. 3, when the lower oil recess R4 conducts upward and downward, the upper transition section 541, the neck section 543, and the lower transition section 542 of the contraction portion 54 of the first piston rod 50 correspond to the joint of the first valve opening 34 of the oil seal valve seat 30 and the opening of the shaft tube 31, the washer on the inner surface of the shaft tube 31, and the opening of the orifice 35, respectively.

In the first embodiment of the present invention, as shown in FIGS. 2 and 3, two washers are embedded on the outer surface of the shaft 51 for sealing and combination with the bottom inner surface of the shaft tube 31; and the two washers are round profiled washers.

In the first embodiment of the present invention, as shown in FIGS. 2 and 3, the bottom of the first piston rod 50 is further axially recessed with a mounting groove 55 for securing a linkage 56 used to be assembled with a brake switch (not shown) for pulling the first piston rod 50 to close or open the first valve opening 34 of the oil seal valve seat 30.

Wherein, as shown in FIGS. 4 and 5, the two ends of the second piston rod 60 are formed into an assembled shaft head 62 and a piston head 63, respectively, and the assembled shaft head 62 and the piston head 63 are constricted to form a rod body 61. The second piston rod 60 is movably threaded through the axial passage 44 and the groove 45 of the piston valve seat 40, and the outer surface of the assembled shaft head 62 has embedded a washer to seal and combine with the inner surface of the axial passage 44; the outer two ends of the piston head 63 have embedded two washers 631 to seal and combine with the inner surface of the assembly section 452 of the groove 45; the rod body 61 of the second piston rod 60 and the inner surface of the axial passage 44 and the groove 45 of the piston valve seat 40 together form an upper oil recess R5; and the second valve opening 47 of the piston valve seat 40, the upper oil recess R5, and the passage 46 together form a second oil passage.

As shown in FIG. 4, the second piston rod 60 is compressed by a spring 49, so that the piston head 63 is normally pressed against the adjacent area of the axial passage 44 and the groove 45, so that the piston head 63 is located in the outreach section 451 of the groove 45 and the two washers 631 block the communication between the second valve opening 47 and the upper oil recess R5. As shown in FIG. 5, when the second piston rod 60 is displaced downward to compress the spring 49 by an external force, the piston head 63 is displaced into the assembly section 452 of the groove 45 and the two washers 631 are moved downward to misalign the second valve opening 47 so that the second valve opening 47 communicates with the upper oil recess R5.

Furthermore, in the first embodiment of the present invention, as shown in FIGS. 4 and 5, the piston head 63 of the second piston rod 60 is axially provided with an oil passage 64 from the bottom surface thereof, the bottom of which communicates with a groove 481 of the outer sleeve 48, and the top of which is provided with a plurality of oil orifices 65 along a radial direction for communicating with the upper oil recess R5; the groove 481, the oil passage 64, and the oil orifices 65 together form a balanced oil passage for maintaining a balance of pressure between the groove 481 and the upper oil recess R5 during axial displacements with resetting capability of the second piston rod 60.

In the first embodiment of the present invention, as shown in FIGS. 4 and 5, a circular profiled washer is embedded on the outer surface of the assembled shaft head 62 of the second piston rod 60, and the two washers 631 on the outer surface of the piston head 63 are circular profiled washers, respectively.

In the first embodiment of the present invention, the lower portion of the oil-gas mixing chamber R1 is filled with oil A, and the upper portion is filled with gas B at a specific pressure range according to the demand of use; the upper oil chamber R2, the lower oil chamber R3, and the first oil passage (comprising the first valve opening 34, the lower oil recess R4, and the orifice 35), a second oil passage (comprising the second valve opening 47, the upper oil recess R5, and the passage 46), a balanced oil passage (comprising the groove 481 space of the outer sleeve 48, the oil passage 64 and the oil orifice 65) are filled with oil A. Thereby, the embodiment of the present invention generates an internal pressure by filling the sealing space and the flow passage inside the cylinder 10 with oil A and gas B. In conjunction with the closing of the first piston rod 50 and/or the second piston rod 60 to block or open the oil passage conduit, the internal pressure of the cylinder 10 is changed to control the downward contraction and the upward restoration of the actuator tube 20 with respect to the cylinder 10.

Figure 6:
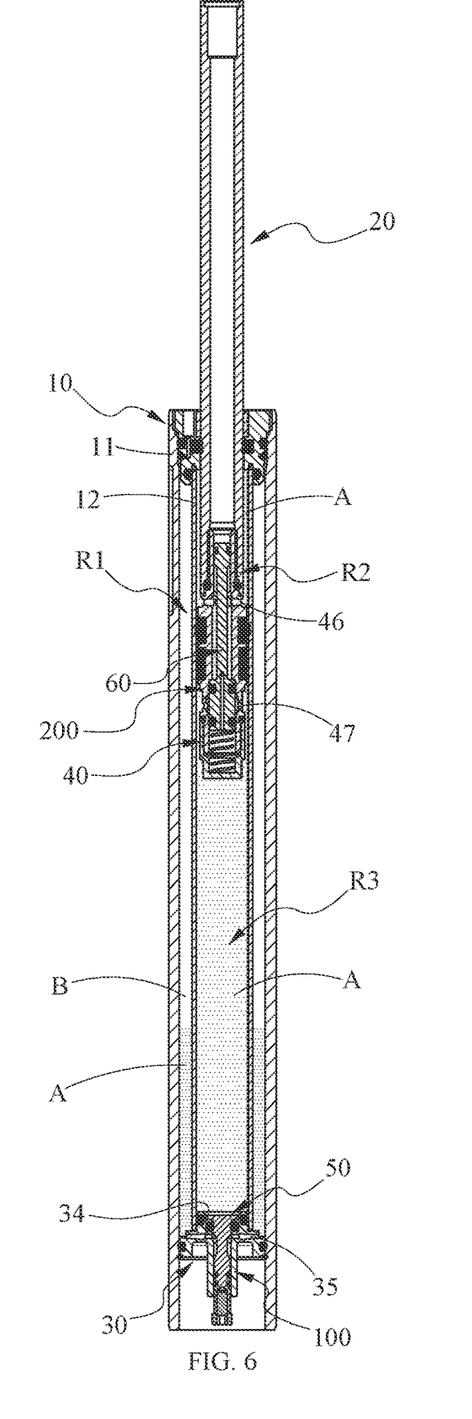
FIGS. 6 and 7 are schematic diagrams of the first valve group of the first embodiment of the present invention in a closed state, and steplessly adjusting the actuating tube to lift up and down.
Figure 7:
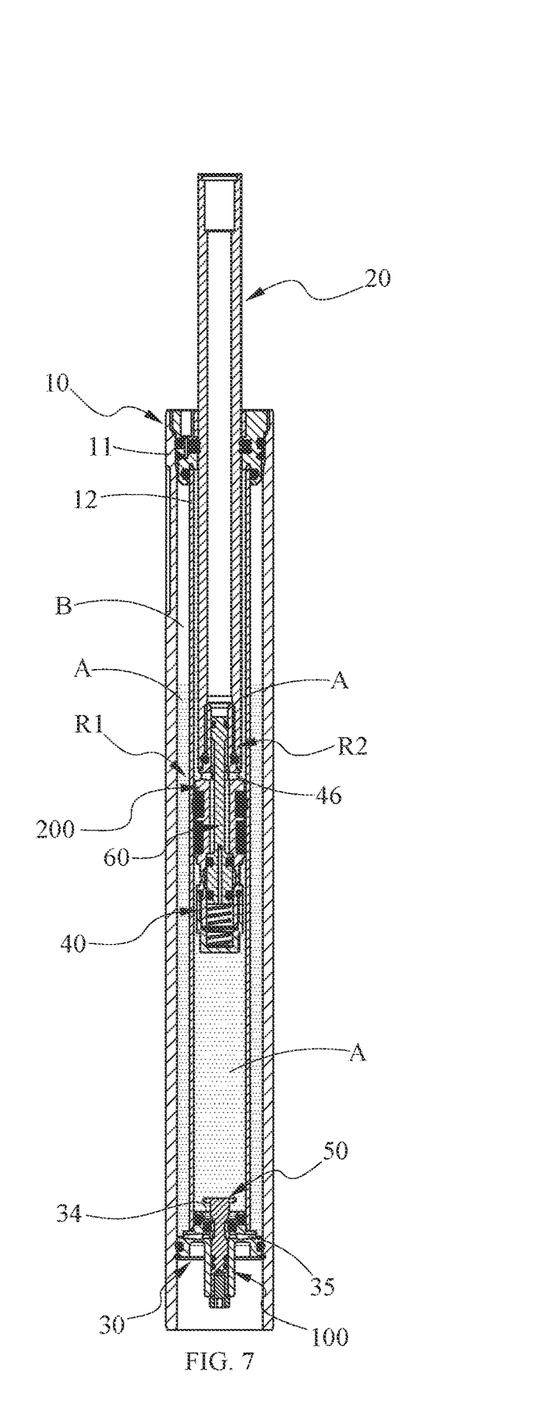

As shown in FIGS. 6 and 7, the stepless lifting and lowering adjustment of the stroke-adjustable pneumatic-hydraulic pressure unit of the present invention is accomplished by controlling the first piston rod 50 to enable the actuating tube 20 to be lifted and lowered with respect to the cylinder 10 under the state in which the second piston rod 60 closes the second valve opening 47 (i.e., the second oil passage is blocked). Wherein, as shown in FIGS. 6 to 7, after the first piston rod 50 is opened and the first oil passage is conducted, an external force is applied to press the actuating tube 20 downward and contract it into the cylinder 10, and then the piston valve seat 40 is displaced downward in the outer tube 11 and squeezes the oil A in the lower oil chamber R3 so that the oil A flows from the lower oil chamber R3 through the first oil passage into the oil-gas mixing chamber R1; at this time, the gas B in the oil-gas mixing chamber R1 is compressed to form an internal pressure which is balanced with the external force, and when the external force is continuously applied to the actuating tube 20, the actuating tube 20 maintains a downward pressure and is contracted internally in the cylinder body 10; when the external force is removed, the internal pressure formed by the compression of the gas B causes the oil A in the oil-gas mixing chamber R1 to flow back into the lower oil chamber R3, thereby displacing the piston valve seat 40 and lifting the actuating tube 20 upward to restore the position.

In addition, in the first embodiment of the present invention, when the first valve opening 34 is opened and the second valve opening 47 is closed for a stepless lifting and lowering operation, a sealed space is formed in the upper oil chamber R2, and therefore a negative pressure is formed in the upper oil chamber R2 by expanding the volume with the downward displacement of the piston valve seat 40, which is lifted with the restoration of the piston valve seat 40 when the external force is removed.

Figure 8:
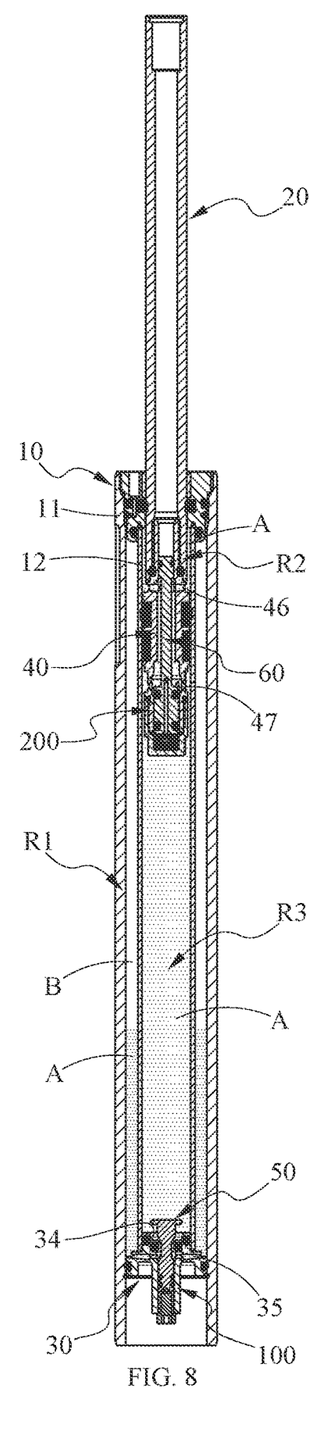
FIGS. 8 to 10 are schematic diagrams of the first embodiment of the present invention showing the actions of first adjusting and fixing the final total stroke of the actuating tube (FIGS. 8 and 9), and then steplessly lifting and lowering the actuating tube within the final total stroke (FIGS. 9 and 10)

As shown in FIGS. 8, 9 and 10, the total exposed stroke adjustment of the actuating tube 20 of the adjustable pneumatic-hydraulic pressure unit for stroke control of the present invention is as shown in FIG. 8, under the state in which the first valve opening 34 is opened by the first piston rod 50 and the second valve opening 47 is opened by the second piston rod 60 (i.e., the first and second oil passages are conducted simultaneously) to allow the actuating tube 20 to be lifted and lowered to a desired position with respect to the cylinder 10, and then, by means of the second oil passage, the oil A flows into the enlarged upper oil chamber R2 to achieve pressure balance (no negative pressure is formed); next, as shown in FIG. 9, by controlling the second piston rod 60 to close the second valve opening 47 (i.e., the second oil passage is blocked), the actuating tube 20 is positioned in the desired position without applying any external force, thereby achieving the purpose of adjusting the total exposed stroke of the actuating tube 20. Furthermore, the actuating tube 20 can be positioned relative to the cylinder 10 within the adjusted total stroke length by controlling the first piston rod 50 to lift and lower steplessly when an external force is applied, as shown in FIGS. 9 to 10. In addition, when the external force is removed, since the second oil passage is closed, the oil A in the upper oil chamber R2 cannot be compressed and squeezed out, the exposed length of the actuating tube 20 is lifted and restored to the maximum length of the adjusted total stroke, so that the embodiment of the present invention results in a stroke-adjustable pneumatic-hydraulic pressure unit with a height-adjustable lift memory function.

The present invention allows the upper oil chamber R2 to selectively form a sealed space or to communicate with the second oil passage by opening or closing the second valve opening 47 so that the adjustable pneumatic-hydraulic pressure unit for stroke control of the present invention can be applied to bicycles. Various adjustment modes (stepless stroke adjustment and exposed total stroke adjustment) can be provided to suit the user's height and habit, to accomplish a bicycle saddle with a memory function.

As shown in FIGS. 11 to 13, the structure of the adjustable pneumatic-hydraulic pressure unit for stroke control of the second embodiment of the present invention is substantially the same as that of the first embodiment, and the difference between the second embodiment and the first embodiment is mainly in the structure of the second valve group 200. Specifically, the second embodiment of the present invention also includes a cylinder 10, an actuating tube 20, a first valve group 100 comprising an oil seal valve seat 30 and a first piston rod 50, and the second valve group 200 comprising a piston valve seat 70 and a second piston rod 80.

In the second embodiment of the present invention, the piston valve seat 70 is shaped as a multi-stage cylinder having a shaft tube 71 formed at the center of the axis of the piston valve seat 70, the outer surface of the top of the shaft tube 71 is expanded to form a small diameter portion 72 and a large diameter portion 73, wherein the peripheral surface of the small diameter portion 72 is sealed to the inner surface of a socket section 22 of the actuating tube 20 by means of a washer, and the large diameter portion 73 is disposed at the end of the shaft tube 71, where the peripheral surface of the large diameter portion 73 is sealed to the inner surface of the inner tube 12 by means of a washer, and a second valve opening 74 is formed at the joint of the shaft tube 71 and the inner tube 12; the inner surface of the inner tube 12, the outer surface of the actuating tube 20, the oil seal 13, and the top of the piston valve seat 70 together form the upper oil chamber R2, and the inner surface of the inner tube 12, the bottom of the piston valve seat 70, and the oil seal valve seat 30 together form the lower oil chamber R3, whereby the peripheral wall of the shaft tube 71 of the piston valve seat 70 is provided with a plurality of orifices 75 communicating with the upper oil chamber R2, and whereby a second piston rod 80 is movably threaded through the shaft tube 71 of the piston valve seat 70 to close or open the second valve opening 74 to block or conduct the second oil passage.

In the second embodiment of the present invention, as shown in FIGS. 12 and 13, the orifices 75 of the piston valve seat 70 are formed between the small diameter portion 72 and the large diameter portion 73 by opening in a radial direction from the shaft tube 71. According to the embodiment of the present invention, the number of orifices 75 of the piston valve seat 70 may be more than two, preferably an even number, preferably six, but is not limited thereto.

In the second embodiment of the present invention, the two ends of the second piston rod 80 are formed into a shaft 81 and a piston head 82, respectively, and the shaft 81 and the piston head 82 are constricted to form a contraction portion 84 between the shaft 81 and the piston head 82, and the contraction portion 84 has a lower transition portion and an upper transition portion integrally connected to the shaft 81 and the piston head 82, respectively, by changing the diameter, and a neck section with fixed diameter is formed between the upper transition portion and the lower transition portion. The second piston rod 80 is movably threaded through the shaft tube 71 of the piston valve seat 70, the inner surface of the shaft tube 71, and the contraction portion 84 of the second piston rod 80 together form the upper oil recess R5, and the second valve opening 74 of the piston valve seat 70, the upper oil recess R5, and the orifice 75 together form the second oil passage of the second embodiment of the present invention. Whereby, the end opening of the shaft tube 71 of the piston valve seat 70 is expanded to form the second valve opening 74, and the end of the piston head 82 of the second piston rod 80 is expanded to form a round-shaped stop portion 83; whereby the second oil passage is closed or opened by the movable embedding or retreating of the end opening of the shaft tube 71 of the piston valve seat 70 and the second valve opening 74 by the piston head 82 and the stop portion 83.

In the second embodiment of the present invention, the shaft tube 71 of the piston valve seat 70 is embedded with a washer on the inner surface of the second valve opening 74 to the orifice 75. As shown in FIG. 12, when the second piston rod 80 is embedded to seal the second oil passage, the stop portion 83 is embedded on the second valve opening 74, and the piston head 82 is embedded in the shaft tube 71 of the piston valve seat 70, and the second oil passage is blocked by being sealed and combined between the outer surface of the piston head 82 and the inner surface of the shaft tube 71 by the washer. As shown in FIG. 13, when the second piston rod 80 retreats to open the second oil passage, the stop portion 83 and a part of the piston head 82 extend into the lower oil chamber R3, and the outer surface of the piston head 82 completely retreats from the washer on the inner surface of the shaft tube 71, so that the upper oil recess R5 between the contraction portion 84 and the shaft tube 71 conducts upward and downward, and the second oil passage communicates with the upper oil chamber R2 and the lower oil chamber R3.

The operation of the second embodiment of the present invention is the same as that of the first embodiment; when stepless lifting and lowering adjustment is required, the first oil passage is opened by controlling the first piston rod 50, and the second oil passage is closed by controlling the second piston rod 80 so that the oil A filling the lower oil chamber R3 flows into or out of the oil-gas mixing chamber R1 through the first oil passage with the compression or extension of the actuating tube 20 to realize the lifting and lowering adjustment of the actuating tube 20. After the adjustment of the actuating tube 20 to the desired height, the first oil passage is closed by controlling the first piston rod 50 to block the flow of oil A so that the actuating tube 20 can be positioned at the adjusted height, thereby realizing the purpose of positioning the actuating tube 20 after the stepless lifting and lowering adjustment.

When it is necessary to adjust the total exposed stroke of the actuating tube 20, the first oil passage can be opened by controlling the first piston rod 50 and the second oil passage can be opened by controlling the second piston rod 80, so that when the actuating tube 20 is compressed or extended, the oil A filling the lower oil chamber R3 flows into or out of the oil-gas mixing chamber R1 through the first oil passage and flows into or out of the upper oil chamber R2 through the second oil passage simultaneously, and when the actuating tube 20 is adjusted to the desired total exposed stroke, the second oil passage is closed by controlling the second piston rod 80 to block the flow of oil A in the second oil passage so that the total exposed stroke of the actuating tube 20 can be fixed accordingly.

The foregoing is only a preferred embodiment of the present invention and is in no way a limitation of the present invention. Any person of ordinary skill in the art may, without departing from the scope of the technical scheme of the present invention, utilize the equivalent embodiment with partial changes or modifications of the technical content of the disclosure of the present invention without departing from the content of the technical scheme of the present invention which is still within the scope of the technical scheme of the present invention.

What is claimed is:

1. An adjustable pneumatic-hydraulic pressure unit for stroke control, comprising:

a cylinder containing an outer tube, an inner tube, and an oil seal; the oil seal being sealed and fixed to the top of the outer tube and the inner tube, with an axial hole threading through the center of the oil seal;

an actuating tube sealed and combined with the oil seal and movably threaded through the axial hole for axial movement relative to the inner tube;

a first valve group sealed and fixed to the bottom of the outer tube; the inner tube, the inner surface of the outer tube, the outer surface of the inner tube, the oil seal, and the first valve group together forming an oil-gas mixing chamber; the first valve group being provided with a first oil passage internally communicating the oil-gas mixing chamber to an inner chamber defined in the inner tube and means for optional blocking the first oil passage; and a second valve group fixedly attached to the bottom of the actuating tube and sealed and fixed to the inner surface of the inner tube; the inner surface of the inner tube, the outer surface of the actuating tube, the oil seal, and the top of the second valve group together forming an upper oil chamber, and the inner surface of the inner tube, the bottom of the second valve group, and the first valve group together forming a lower oil chamber; and the second valve group is internally provided with a second oil passage communicating the upper oil chamber and the lower oil chamber and means for optionally blocking the second oil passage.

2. The adjustable pneumatic-hydraulic pressure unit for stroke control according to claim 1, wherein the bottom of the oil seal is covered on the top of the inner tube, and the top edge of the inner tube is sealed against a circumferential plane of the axial hole;

the first valve group comprises an oil seal valve seat and a first piston rod, wherein the oil seal valve seat is sealed and fixed to the bottom of the outer and inner tubes, and the inner surface of the outer tube, the outer surface of the inner tube, the oil seal, and the oil seal valve seat together form the oil-gas mixing chamber; at an axis of the oil seal valve seat is formed into a shaft tube, and a first valve opening is formed at a joint of the shaft tube and the inner tube, and a plurality of orifices are provided on the peripheral wall of the shaft tube communicating with the oil-gas mixing chamber; the first piston rod is movably threaded into the shaft tube of the oil seal valve seat to close or open the first valve opening to block or conduct the first oil passage; and the second valve group comprises a piston valve seat and a first piston rod, wherein the piston valve seat is fixed to the bottom of the actuating tube and sealingly combined with the inner surface of the inner tube, wherein the inner surface of the inner tube, the outer surface of the actuating tube, the oil seal, and the top of the piston valve seat together form the upper oil chamber, and the inner surface of the inner tube, the bottom of the piston valve seat, and the oil seal valve seat together form the lower oil chamber; at an axis of the piston valve seat is formed with a shaft tube, a second valve opening is formed at the joint of the shaft tube and the inner tube, and a plurality of orifices are provided on the peripheral wall of the shaft tube communicating with the upper oil chamber; the second piston rod is movably threaded through the shaft tube of the piston valve seat to close or open the second valve opening to block or conduct the second oil passage.

3. The adjustable pneumatic-hydraulic pressure unit for stroke control according to claim 2, wherein, the bottom periphery of the oil seal is protruded along the axial direction to form a ring-concave wall, and a washer is concavely embedded in the inner surface of the ring-concave wall; the top of the inner tube is inserted in a slot defined by the ring-concave wall, and the top edge of the inner tube is pressed against the circumferential plane of the axial hole, and the inner surface of the ring-concave wall is sealingly combined with the outer surface of the inner tube through a washer, thereby enabling the inner chamber and the outer surface of the inner tube to be sealingly isolated from each other and not communicated at the top.

4. The adjustable pneumatic-hydraulic pressure unit for stroke control according to claim 2, wherein, the middle section of the second piston rod is constricted to form a contraction portion; the inner surface of the shaft tube of the piston valve seat and the contraction portion of the second piston rod together form an upper oil recess; and the second valve opening of the piston valve seat, the upper oil recess, and the orifice together form the second oil passage.

5. The adjustable pneumatic-hydraulic pressure unit for stroke control according to claim 2, wherein, the actuating tube is steplessly adjusted for lifting and lowering by axial displacement relative to the cylinder in a state in which the second piston rod closes the second valve opening and the first piston rod opens the first valve opening; and the actuating tube is positioned relative to the cylinder in a state in which the second piston rod closes the second valve opening and the first piston rod closes the first valve opening.

6. The adjustable pneumatic-hydraulic pressure unit for stroke control according to claim 2, wherein, the actuating tube is adjusted its total exposed stroke by axial displacement relative to the cylinder in a state in which the first piston rod opens the first valve opening and the second piston rod opens the second valve opening; and the second piston rod closes the second valve opening after adjusting the total exposed stroke of the cylinder so that the actuating tube is positioned relative to the cylinder in the state in which no external force is applied.

7. The adjustable pneumatic-hydraulic pressure unit for stroke control according to claim 1, wherein, the bottom of the oil seal of the cylinder is covered on the top of the inner tube, and the top edge of the inner tube is sealed against the circumferential plane of the axial hole;

the first valve group comprises an oil seal valve seat and a first piston rod, wherein the oil seal valve seat is sealed and fixed to the bottom of the outer and inner tubes, and the inner surface of the outer tube, the outer surface of the inner tube, the oil seal, and the oil seal valve seat together form the oil-gas mixing chamber; at the axis of the oil seal valve seat is formed into a shaft tube, and a first valve opening is formed at the joint of the shaft tube and the inner tube, and a plurality of orifices are provided on the peripheral wall of the shaft tube communicating with the oil-gas mixing chamber; the first piston rod is movably threaded through the shaft tube of the oil seal valve seat to close or open the first valve opening to block or conduct the first oil passage; and the second valve group comprises a piston valve seat and a second piston rod, wherein the piston valve seat is formed into a piston portion in the middle section, and the top and bottom of the piston valve seat are respectively contracted to form a connecting shaft portion and a valve seat portion; the outer surface of the piston portion is sealingly combined with the inner surface of the inner tube, the inner surface of the inner tube, the outer surface of the actuating tube, the oil seal, and the piston valve seat together form the upper oil chamber, and the inner surface of the inner tube, the piston valve seat, and the oil seal valve seat together form the lower oil chamber; the piston portion and the connecting shaft portion have an axial passage running through their inner portions, the connecting shaft portion is fixed to the bottom of the actuating tube, the axial passage runs through the top of the piston valve seat and communicates with the inner side of the actuating tube, and a plurality of passages are provided in the peripheral wall of the axial passage of the piston valve seat to communicate with the upper chamber; the inner side of the seat portion has a groove formed by expanding out from the axial passage, and a plurality of second valve openings are provided in the peripheral wall of the groove of the valve seat to communicate with the lower oil chamber; a spring is fixed to the end of the valve seat; the second piston rod is movably threaded through the axial passage and the groove of the piston valve seat to close or open the second valve opening to block or conduct the second oil passage.

8. The adjustable pneumatic-hydraulic pressure unit for stroke control according to claim 7, wherein, the bottom periphery of the oil seal is protruded along the axial direction to form a ring-concave wall, and a washer is concavely embedded in the inner surface of the ring-concave wall; the top of the inner tube is inserted in a slot defined by the ring-concave wall, and the top edge of the inner tube is pressed against the circumferential plane of the axial hole, and the inner surface of the ring-concave wall is sealingly combined with the outer surface of the inner tube through a washer, thereby enabling the inner chamber and the outer surface of the inner tube to be sealingly isolated from each other and not communicated at the top.

9. The adjustable pneumatic-hydraulic pressure unit for stroke control according to claim 2, wherein, the middle section of the first piston rod is constricted to form a contraction portion; the inner surface of the shaft tube of the oil seal valve seat and the contraction portion of the first piston rod together form a lower oil recess; and the first valve opening, the lower oil recess, and the orifice of the oil seal valve seat together form a first oil passage.

10. The adjustable pneumatic-hydraulic pressure unit for stroke control according to claim 7, wherein, the middle section of the first piston rod is constricted to form a contraction portion; the inner surface of the shaft tube of the oil seal valve seat and the contraction portion of the first piston rod together form a lower oil recess; and the first valve opening, the lower oil recess, and the orifice of the oil seal valve seat together form a first oil passage.

11. The adjustable pneumatic-hydraulic pressure unit for stroke control according to claim 7, wherein, the middle section of the second piston rod is constricted to form a rod body; the rod body of the second piston rod and the inner surface of the axial passage, and the groove of the piston valve seat together form an upper oil recess; and the second valve opening of the piston valve seat, the upper oil recess, and the passage together form the second oil passage.

12. The adjustable pneumatic-hydraulic pressure unit for stroke control according to claim 11, wherein, the bottom of the second piston rod is shaped as a piston head; the piston valve seat further comprises an outer sleeve snap-fitted to the outside of the valve seat, wherein the outer sleeve has opposing closed and open ends, wherein the inner portion of the outer sleeve is formed into a groove at the closed end, and the spring is mounted between the groove and the piston head of the second piston rod; and the piston head of the second piston rod is axially provided with an oil passage from its bottom surface, the bottom of the oil passage is communicated with the groove of the outer sleeve, and the top of the oil passage is provided with a plurality of oil orifices along the radial direction to be communicated with the upper oil recess; the groove, the oil passage, and the oil orifices together form a balanced oil passage.

13. The adjustable pneumatic-hydraulic pressure unit for stroke control according to claim 7, wherein, the actuating tube is steplessly adjusted for lifting and lowering by axial displacement relative to the cylinder in a state in which the second piston rod closes the second valve opening and the first piston rod opens the first valve opening; and the actuating tube is positioned relative to the cylinder in a state in which the second piston rod closes the second valve opening and the first piston rod closes the first valve opening.

14. The adjustable pneumatic-hydraulic pressure unit for stroke control according to claim 7, wherein, the actuating tube is adjusted its total exposed stroke by axial displacement relative to the cylinder in a state in which the first piston rod opens the first valve opening and the second piston rod opens the second valve opening; and the second piston rod closes the second valve opening after adjusting the total exposed stroke of the cylinder so that the actuating tube is positioned relative to the cylinder in the state in which no external force is applied.

\* \* \* \* \*